(12) United States Patent
Ryan et al.

(10) Patent No.: US 12,309,487 B2
(45) Date of Patent: May 20, 2025

(54) CAMERA IDENTIFICATION METHOD, AUTHENTICATION METHOD, SYSTEM, AND TERMINAL

(71) Applicant: SHENZHEN YINWANG INTELLIGENT TECHNOLOGIES CO., LTD., Shenzhen (CN)

(72) Inventors: Mark Ryan, Birmingham (GB); Flavio Garcia, Birmingham (GB); Steven Yin Zhong, Singapore (SG); Zhuo Wei, Singapore (SG)

(73) Assignee: SHENZHEN YINWANG INTELLIGENT TECHNOLGOIES CO., LTD., Shenzhen (CN)

( * ) Notice: Subject to any disclaimer, the term of this patent is extended or adjusted under 35 U.S.C. 154(b) by 286 days.

(21) Appl. No.: 17/896,719

(22) Filed: Aug. 26, 2022

(65) Prior Publication Data

US 2022/0417425 A1 Dec. 29, 2022

Related U.S. Application Data

(63) Continuation of application No. PCT/CN2020/129076, filed on Nov. 16, 2020.

(51) Int. Cl.
*H04N 23/60* (2023.01)
*G06T 7/73* (2017.01)
*H04N 23/80* (2023.01)

(52) U.S. Cl.
CPC ............. *H04N 23/665* (2023.01); *G06T 7/74* (2017.01); *G06T 7/75* (2017.01); *H04N 23/80* (2023.01); *G06T 2207/10021* (2013.01)

(58) Field of Classification Search
CPC ........ H04N 23/665; H04N 23/80; G06T 7/74; G06T 7/75; G06T 2207/10021
See application file for complete search history.

(56) References Cited

U.S. PATENT DOCUMENTS

| | | | |
|---|---|---|---|
| 10,235,765 | B1 | 3/2019 | Charlton et al. |
| 2016/0360962 | A1 | 12/2016 | Okamoto et al. |
| 2018/0157680 | A1 | 6/2018 | Valsesia et al. |
| 2018/0240216 | A1 | 8/2018 | Dirik et al. |

(Continued)

FOREIGN PATENT DOCUMENTS

| | | |
|---|---|---|
| CN | 101273621 A | 9/2008 |
| CN | 107063266 A | 8/2017 |

(Continued)

OTHER PUBLICATIONS

Kang Xiangui et al, "A context-adaptive SPN predictor for trustworthy source camera identification," EURASIP Journal on Image and Video Processing, vol. 2014, No. 1, Dec. 1, 2014, XP055964535, 11 pages.

*Primary Examiner* — Mohamed A. Wasel
(74) *Attorney, Agent, or Firm* — Conley Rose, P.C.

(57) ABSTRACT

A camera identification method comprises identifying a to-be-identified camera using a light sensitivity deviation of each pixel in the to-be-identified camera; generating corresponding identification data; identifying a target camera using a light sensitivity deviation of each pixel in the target camera; and identifying the target camera by comparing a similarity between data that identifies the target camera and identification data of a known camera.

20 Claims, 5 Drawing Sheets

(56) References Cited

U.S. PATENT DOCUMENTS

| | | | |
|---|---|---|---|
| 2019/0068582 A1* | 2/2019 | Kim | G01S 5/0072 |
| 2019/0260739 A1 | 8/2019 | Magli et al. | |
| 2020/0324784 A1* | 10/2020 | Liang | G06V 20/597 |
| 2022/0217358 A1 | 7/2022 | Zeng et al. | |

FOREIGN PATENT DOCUMENTS

| | | |
|---|---|---|
| CN | 107735783 A | 2/2018 |
| CN | 107959688 A | 4/2018 |
| CN | 109997137 A | 7/2019 |
| CN | 110446044 A | 11/2019 |
| CN | 111353504 A | 6/2020 |
| CN | 111736286 A | 10/2020 |

\* cited by examiner

|  | Camera 1 images 1-50 | Camera 2 images 1-50 | Camera 3 images 1-50 | Camera 4 images 1-50 |
|---|---|---|---|---|
| Camera 1 images 51-100 | 0.652 23 px | 0.000 0 px | 0.000 0 px | 0.000 0 px |
| Camera 2 images 51-100 | 0.000 0 px | 0.423 9 px | 0.000 0 px | 0.000 0 px |
| Camera 3 images 101-150 | 0.003 1 px | 0.000 0 px | 0.618 25 px | 0.000 0 px |
| Camera 4 images 101-150 | 0.000 0 px | 0.000 0 px | 0.000 0 px | 0.369 9 px |

FIG. 9

|  | Camera 1 1-500 | Camera 2 1-500 | Camera 3 1-500 | Camera 4 1-500 |
|---|---|---|---|---|
| Camera 1 501-750 | 0.959 8 px | 0.000 0 px | 0.000 0 px | 0.000 0 px |
| Camera 2 501-750 | 0.000 0 px | 0.998 10 px | 0.000 0 px | 0.000 0 px |
| Camera 3 751-1000 | 0.000 0 px | 0.000 0 px | 0.975 9 px | 0.000 0 px |
| Camera 4 751-1000 | 0.000 0 px | 0.000 0 px | 0.000 0 px | 0.974 9 px |

CAMERA IDENTIFICATION METHOD, AUTHENTICATION METHOD, SYSTEM, AND TERMINAL

CROSS-REFERENCE TO RELATED APPLICATIONS

This application is a continuation application of International Patent Application No. PCT/CN2020/129076, filed on Nov. 16, 2020, the disclosure of which is hereby incorporated by reference in its entirety.

TECHNICAL FIELD

The present disclosure mainly relates to the field of image data processing technologies, and in particular, to a camera identification method, an authentication method, a system, and a terminal.

BACKGROUND

As people require simplified operations on various terminals such as vehicles, more terminals use automatic control to liberate people from operations. To replace human operations, a camera for replacing a human eye and a control system for replacing a human brain need to be installed on a terminal, so that a combination of the camera and the control system can be used to make a decision and perform control in place of people. When the camera is used, authentication needs to be performed to ensure legality of the camera and avoid a security risk caused by a malicious camera replacement or the like to operations of the control system.

Usually, the camera may be authenticated based on a digital certificate and a digital signature, or the camera is authenticated based on a symmetric key. In an authentication mode based on a digital certificate and a digital signature, a root certificate needs to be generated for the control system; then a digital certificate of the camera is issued based on the root certificate; and then the root certificate is saved to the control system, and the digital certificate and a private key of the camera are saved to the camera. The control system authenticates the camera separately by using the digital certificate of the camera and a digital signature that is generated by the camera based on a random number sent by the control system. In an authentication mode based on a symmetric key, the camera and the control system need to store a key in advance; the control system sends a random number to the camera; then the control system and the camera encrypt the random number respectively by using the key; and then the control system authenticates the camera by comparing an encrypted ciphertext of the camera with that of the control system.

Whichever authentication mode is used, cooperation between the camera and the control system is required. In particular, the camera needs to be pre-programmed, and the key needs to be stored in the camera, to meet a subsequent signature requirement, an encryption requirement, and the like. However, most cameras are purchased from a third party, and it is difficult to perform pre-programming. Therefore, the key is prone to leakage during distribution. In addition, because the camera does not have a key storage function, the key is subject to leakage more easily. Therefore, security of a camera authentication process is reduced.

SUMMARY

This application provides a camera identification method, an authentication method, a system, and a terminal, to identify and authenticate a camera by using a physical characteristic of the camera, without requiring an additional identifier and authentication data for identifying and authenticating the camera, thereby effectively improving security of a camera authentication process.

According to a first aspect, this application provides a camera identification method, applied to a camera authentication system, where the method includes extracting a first target image from a video stream sent by a to-be-identified camera; obtaining a plurality of pixel blocks from the first target image, where the pixel block includes one first pixel and a plurality of second pixels; establishing, based on a perceived light intensity value of the first pixel and perceived light intensity values of the plurality of second pixels in each pixel block, a linear relationship model corresponding to the to-be-identified camera, where the perceived light intensity value is a light intensity value corresponding to the video stream; substituting perceived light intensity values of a plurality of second pixels in a plurality of target pixel blocks into the linear relationship model, to obtain predicted light intensity values of first pixels in the target pixel blocks, where the plurality of target pixel blocks are obtained from an image shot by the to-be-identified camera; and calculating differences between the predicted light intensity values and perceived light intensity values of the first pixels in the plurality of target pixel blocks, to obtain light sensitivity deviations of the first pixels in the plurality of target pixel blocks and use the light sensitivity deviations as identification data of the to-be-identified camera.

In this way, the corresponding identification data, that is, light sensitivity deviations of a plurality of first pixels in the first target image, can be generated for the to-be-identified camera. The identification data is a physical characteristic corresponding to the to-be-identified camera. As long as the to-be-identified camera remains unchanged, the identification data will not be lost or changed. Therefore, a stable reference basis can be provided for authenticating a target camera.

In an implementation, the establishing, based on a perceived light intensity value of each pixel and perceived light intensity values of the plurality of second pixels, a linear relationship model corresponding to the to-be-identified camera includes, by using the perceived light intensity values of the plurality of second pixels in each pixel block as an input value of an initial linear relationship model and using the perceived light intensity value of the first pixel in each pixel block as an output value of the initial linear relationship model, training each constant in the initial linear relationship model, to obtain the linear relationship model.

In this way, the linear relationship model is obtained by continuously training a linear relationship, so that each constant in the linear relationship model is optimized. This makes the predicted light intensity value of the first pixel calculated by using the linear relationship model closer to the perceived light intensity value of the first pixel, thereby improving accuracy of identifying the target camera.

In an implementation, the linear relationship model complies with the following formula:

$$x_{a,b} = \sum_{\substack{1 \le j,k \le n \\ (j,k) \ne (a,b)}} c_{j,k} x_{j,k} + p$$

$x_{a,b}$ represents a predicted light intensity value of the first pixel in the pixel block, the first pixel is located in a row a and a column b in the pixel block, $c_{j,k}$ represents a first constant, $x_{j,k}$ represents a perceived light intensity value of a pixel in a row j and a column k in the pixel block, and p represents a second constant.

In an implementation, the identification data is a first vector or the light sensitivity deviations of the first pixels in the plurality of target pixel blocks, where the first vector includes light sensitivity deviations corresponding to target first pixels, and the target first pixels are first pixels corresponding to a preset quantity of highest light sensitivity deviations among the light sensitivity deviations corresponding to the first pixels in the plurality of target pixel blocks.

Further, the first pixels in the plurality of target pixel blocks are in a one-to-one correspondence with available pixels in the first target image, and the available pixels are pixels in the first target image other than a second pixel located at an image boundary.

This application provides a plurality of types of identification data, to meet requirements for identifying different to-be-identified cameras.

According to a second aspect, this application provides a camera authentication method, applied to a camera authentication system, where a target camera corresponds to the foregoing to-be-identified camera, and the method includes extracting a second target image from a video stream sent by the target camera; obtaining a plurality of pixel blocks from the second target image, where each of the plurality of pixel blocks includes one first pixel and a plurality of second pixels; substituting perceived light intensity values of the plurality of second pixels in the plurality of pixel blocks into a linear relationship model, to obtain a predicted light intensity value of the first pixel in each of the plurality of pixel blocks; calculating a difference between the predicted light intensity value and a perceived light intensity value of each first pixel, to obtain a light sensitivity deviation of each first pixel; and authenticating the target camera based on the light sensitivity deviation of the first pixel in each pixel block and identification data corresponding to each pixel block.

In this way, a physical characteristic of the target camera, that is, a light intensity value reflected by the target camera when the image is shot, is obtained, and an identity of the target camera is authenticated based on the light intensity value. There may be no need to improve the target camera, for example, program the target camera, store a key on the target camera side, or perform encryption/decryption calculation on the target camera side. Therefore, a problem that an authentication process of the target camera fails due to an improvement of the target camera is effectively avoided, and security of the authentication process of the target camera is further improved.

In an implementation, the identification data is obtained based on data of a plurality of pixel blocks in a known image of a known camera, each of the plurality of pixel blocks in the known image includes one third pixel and a plurality of fourth pixels, and the data of the plurality of pixel blocks is perceived light intensity values of the third pixels and the plurality of fourth pixels in the plurality of pixel blocks.

In an implementation, the identification data is a first vector or light sensitivity deviations corresponding to the plurality of pixel blocks, and the light sensitivity deviation is a difference between a perceived light intensity value and a predicted light intensity value of the third pixel in each pixel block, where the first vector includes light sensitivity deviations corresponding to target third pixels, and the target third pixels are third pixels corresponding to a preset quantity of highest light sensitivity deviations among light sensitivity deviations corresponding to the third pixels in the plurality of pixel blocks.

Further, the third pixels in the plurality of pixel blocks are in a one-to-one correspondence with available pixels in the known image, and the available pixels are pixels in the known image other than a fourth pixel located at an image boundary.

In this way, data used to identify the target camera can be compared with different prestored identification data, and the target camera is further accurately authenticated by using the physical characteristic of the target camera.

In an implementation, the authenticating the target camera based on the light sensitivity deviation of the first pixel in each pixel block and identification data corresponding to each pixel block includes setting a similarity threshold based on a quantity of second target images and a quantity of the plurality of pixel blocks; calculating a similarity between the light sensitivity deviation of the first pixel in each pixel block and the identification data; and comparing the similarity with the similarity threshold to authenticate the target image.

In this way, the similarity threshold can be flexibly set based on an actual situation, so that the similarity threshold is closer to a real authentication process, thereby effectively improving accuracy of authenticating the target camera.

According to a third aspect, this application provides a camera authentication system, including a receiver, a processor, and a memory, where the receiver is configured to receive a video stream sent by a to-be-identified camera, the memory is configured to store identification data of the to-be-identified camera, and the processor is configured to perform the foregoing camera identification method.

According to a fourth aspect, this application provides a camera authentication system, including a receiver, a processor, and a memory, where the receiver is configured to receive a video stream sent by a target camera, the memory is configured to store identification data of a known camera, and the processor is configured to perform the foregoing camera authentication method.

According to a fifth aspect, this application provides a terminal, including a camera authentication system and at least one to-be-identified camera, where the to-be-identified camera is configured to shoot a video stream and upload the shot video stream to the camera authentication system, and the camera authentication system is configured to perform the foregoing camera identification method.

According to a sixth aspect, this application provides a terminal, including a camera authentication system and at least one target camera, where the target camera is configured to shoot a video stream and upload the shot video stream to the camera authentication system, and the camera authentication system is configured to perform the foregoing camera authentication method.

BRIEF DESCRIPTION OF DRAWINGS

FIG. 9 is a schematic diagram of a first similarity comparison result according to an embodiment of this application; and FIG. 10 is a schematic diagram of a second similarity comparison result according to an embodiment of this application.

DESCRIPTION OF EMBODIMENTS

Figure 1:
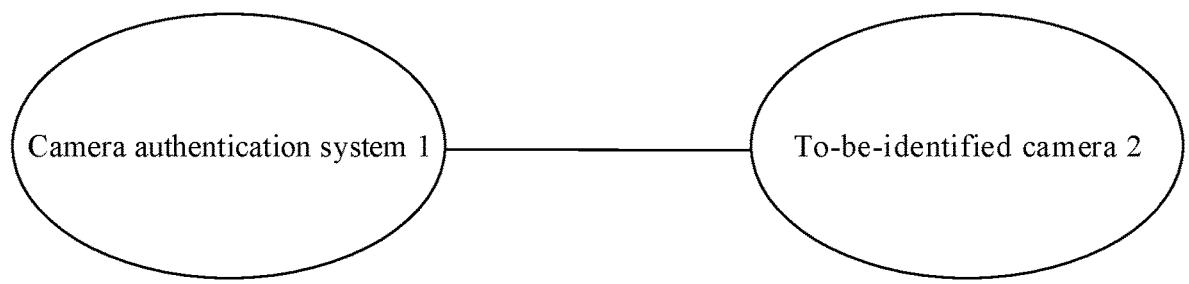
FIG. 1 is a schematic diagram of a structure of a terminal according to an embodiment of this application.

For terminals that need to perform automatic control, for example, a self-driving vehicle, a security protection facility, and an internet of things (IoT) system, accurate automatic control can be implemented only through mutual cooperation between a camera and a control system. Using a self-driving vehicle as an example, a camera needs to be disposed in a specified part of the vehicle to shoot a corresponding picture. For example, a plurality of cameras are disposed at a head of the vehicle, a tail of the vehicle, two sides of a vehicle body, and the inside of the vehicle, and an in-vehicle system (a control system) is deployed in the vehicle. The in-vehicle system analyzes a video stream uploaded by the camera, to determine a vehicle condition of the vehicle, an environment around the vehicle, and the like, control each component of the vehicle (a steering wheel, a lamp, a horn, a window, a brake, a throttle, an alarm, and the like) to work, and achieve an effect of self-driving.

In an example, a video stream uploaded by the camera of the terminal is a basis for the control system to deliver an accurate control instruction for a real situation of the terminal (a status of the terminal, an environment around the terminal, and the like). Therefore, it is particularly important to ensure accuracy of the video stream received by the control system. To ensure accuracy of the video stream received by the control system, it is necessary to ensure photographing quality of the camera. In addition, it is necessary to ensure that the video stream received by the terminal comes from a specified camera. This application describes in detail how to ensure that the video stream received by the terminal comes from the specified camera. The specified camera mentioned in the embodiments of this application is a camera having a correspondence with the terminal, and the video stream shot by the specified camera is used to provide the real situation of the terminal for the control system of the terminal. The specified camera may be disposed on the terminal, or may be disposed at a specified position outside the terminal. For example, a camera a is disposed on a vehicle A, and the camera a is configured to shoot a reverse vehicle image for the vehicle A. In this case, the camera a has a correspondence with the vehicle A. Alternatively, a camera b is disposed in a parking space, and when the vehicle A is parked in the parking space, the camera b is configured to shoot a reverse vehicle image for the vehicle A. In this case, the camera b has a correspondence with the vehicle A. In an automatic control process of the terminal, if some interfering cameras exist around the terminal, for example, a camera that does not have a correspondence with the terminal, or a camera that has a correspondence with the terminal but is illegally changed or replaced, the control system of the terminal is likely to receive a video stream uploaded by the camera. In this case, if the control system delivers a control instruction based on the video stream uploaded by the camera, a security problem is prone to occur. To avoid the foregoing case, after receiving an upload request of the camera, the control system of the terminal first authenticates the camera, and receives, only after the camera is successfully authenticated, the video stream uploaded by the camera, and delivers a corresponding control instruction based on the video stream. It can be learned that the authentication process of the camera is crucial to ensure security of automatic control of the terminal.

Most camera chips do not support hardware security modules. Therefore, data such as digital certificates and keys stored in cameras is easily stolen. If the data is stolen, reverse engineering can be performed to find private keys of the digital certificates, symmetric keys, authentication algorithms, and the like. In this case, a mode of camera authentication based on a digital certificate and a key has a great security risk. In addition, if the camera is authenticated based on the digital certificate, the key, and the like through encryption/decryption, encryption/decryption calculation needs to be performed on the camera side. Therefore, the camera needs to be pre-programmed, and efforts and costs are needed to pre-program the camera. If the camera is purchased from a third party, it is necessary to communicate with the third party about programming, but the third party may not agree to program the camera. Therefore, not only execution is inconvenient, but also programming probably cannot be implemented, and further, camera authentication cannot be implemented.

The camera perceives intensity of incoming light by using a sensor array. The sensor array is covered with a filter layer, and pixels on the filter layer are in a one-to-one correspondence with pixels on the sensor array. Each pixel on the filter layer allows only light of a specified color to pass, for example, only red, green, or blue light. A pixel arrangement on the filter layer is generally red green green blue (RGGB), red clear clear blue (RCCB), red clear clear clear (RCCC), or the like. In this way, the incoming light is first filtered by the filter layer to obtain light of a specified color on each pixel, and is incident onto a corresponding pixel of the sensor array. During production of the sensor array, due to factors such as a process and technology, different pixels on the sensor array have deviations in perception of light intensity values of incoming light, but for the same incoming light, light intensity values perceived on a same pixel by different sensor arrays having a same pixel arrangement are also different. For ease of description, in the embodiments of this application, an intensity value of light that should be perceived on each pixel by the sensor array is defined as a real light intensity value. Generally, the real light intensity value is close to a light intensity value of the incoming light, and a light intensity value actually perceived on each pixel on the sensor array is defined as a perceived light intensity value. For example, the incoming light has a light intensity value 15 and is incident on a sensor array A and a sensor array B respectively, where perceived light intensity values corresponding to pixels A1, A2, and A3 on the sensor array A are 10, 12, and 14 respectively, and perceived light intensity values corresponding to pixels B1, B2, and B3 on the sensor array B are 11, 13, and 15 respectively. There is no great difference between perceived light intensity values corresponding to different sensor arrays, and the perceived light intensity values of the sensor arrays vary with different real light intensity values. It is difficult to obtain a fixed standard value. Therefore, it is not convenient to directly use the perceived light intensity values as identification data of the camera. If a difference between a real light intensity value and a perceived light intensity value is defined as a light sensitivity deviation, it can be learned that light sensitivity deviations of the pixels A1, A2, and A3 on the sensor array A from the real light intensity value are 5, 3, and 1 respectively, and that light sensitivity deviations of the pixels B1, B2, and B3 on the sensor array B from the real light intensity value are 4, 2, and 0 respectively. In an example, the light sensitivity deviations of pixels on the sensor array A and the sensor array B for the incoming light are different, and the light sensitivity deviation is a relatively stable value. Therefore, the light sensitivity deviation may be used as identification data of the camera. The light sensitivity deviation of the camera is determined by the real light intensity value of the incoming light and a sensitometric characteristic of the sensor array, and is not caused by factors other than the camera. Therefore, if the light sensitivity deviation is used as the identification data of the camera, it is equivalent to directly using a physical characteristic of the camera to identify the camera. Therefore, there is no need to manually add other factors used for identification to the camera, such as digital certificates and keys.

This application provides a camera identification method. The method is as follows.

FIG. 1 is a schematic diagram of a structure of a terminal according to an embodiment of this application. The terminal includes a camera authentication system and at least one to-be-identified camera. Using FIG. 1 as an example, the terminal includes a camera authentication system 1 and a to-be-identified camera 2. The camera authentication system 1 communicates with the to-be-identified camera 2. Data transmission may be performed by using a connection mode such as BLUETOOTH or WIFI DIRECT. The to-be-identified camera 2 is the specified camera mentioned above.

Figure 2:
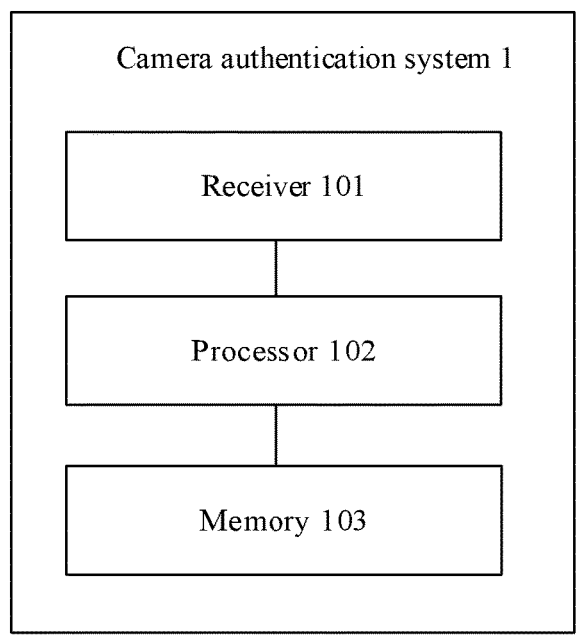
FIG. 2 is a schematic diagram of a structure of a camera authentication system according to an embodiment of this application.

FIG. 2 is a schematic diagram of a structure of a camera authentication system according to an embodiment of this application. As shown in FIG. 2, the camera authentication system 1 includes a receiver 101, a processor 102, and a memory 103. The receiver 101, the processor 102, and the memory 103 are coupled to each other.

The receiver mentioned in this embodiment of this application may be a communications interface on a terminal device. The communications interface may be one or more fiber link interfaces, Ethernet interfaces, microwave link interfaces, copper wire interfaces, or the like, and includes a network adapter (network adapter), a network interface card (network interface card), a local area network (LAN) receiver (LAN adapter), a network interface controller (NIC), a modem, or the like. The interface unit 130 may be an independent component, or may be partially or completely integrated or packaged in the processor 110 as a part of the processor 110. The receiver may be configured to receive a video stream uploaded by the to-be-identified camera.

In this embodiment of this application, the processor 110 of the control device 100 may include one or more processing units, for example, a system-on-a-chip (SoC), a central processing unit (CPU), a microcontroller (MCU), and a storage controller. Different processing units may be independent components, or may be integrated into one or more processors. In a possible implementation, the camera authentication system 1 may be an original control system of the terminal. For example, an authentication function corresponding to the camera authentication system 1 is added to the original control system through programming, that is, the processor 102 and the original control system are the same. In another possible implementation, the camera authentication system 1 may alternatively be a system independent of the original control system, that is, the processor 102 is a processor independent of the original control system. The processor may be configured to analyze the video stream uploaded by the to-be-identified camera, and generate a corresponding control instruction based on an analysis result.

The memory mentioned in this embodiment of this application may include one or more storage units, for example, may include a volatile memory, for example, a dynamic random-access memory (DRAM) or a static random-access memory (SRAM); and may further include a non-volatile memory (NVM), for example, a read-only memory (ROM) or a flash memory. Different storage units may be independent components, or may be integrated or packaged in one or more processors or communications interfaces, and become a part of the processor or communications interface. The memory is configured to store identification data corresponding to the to-be-identified camera and each computer instruction.

The camera authentication system 1 may further include a transmitter (not shown in the drawing). The transmitter may alternatively be a communications interface on the terminal device. The transmitter and the receiver 101 may be a same communications interface, or may be different communications interfaces. The transmitter may be configured to send each control instruction generated by the processor.

Figure 3:
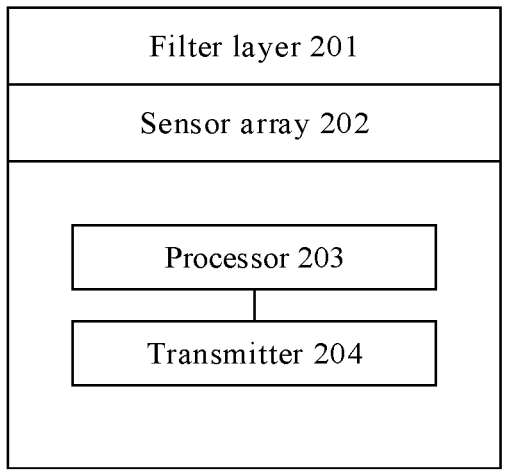
FIG. 3 is a schematic diagram of a structure of a to-be-identified camera according to an embodiment of this application.

FIG. 3 is a schematic diagram of a structure of a to-be-identified camera according to an embodiment of this application. In this embodiment of this application, a camera that needs to be identified is defined as a to-be-identified camera. As shown in FIG. 3, the to-be-identified camera 2 includes a filter layer 201, a sensor array 202, a processor 203, and a transmitter 204. The filter layer 201 is disposed on an upper surface of the sensor array 202. The sensor array 202, the processor 203, and the transmitter 204 are coupled to each other.

The filter layer 201 mentioned in this embodiment of this application may be a single filter layer or three filter layers, and is configured to filter a color of incoming light. Pixels on the filter layer 201 are in a one-to-one correspondence with pixels on the sensor array 202. An arrangement of the pixels on the filter layer 201 may be flexibly set based on an actual filtering requirement.

The sensor array 202 mentioned in this embodiment of this application may be a charge-coupled device (CCD), a complementary metal-oxide-semiconductor (CMOS), or the like, and is configured to perceive a light intensity value of incoming light.

In this embodiment of this application, the processor 110 of the control device 100 may include one or more processing units, for example, a SoC, a CPU, a MCU, and a storage controller. Different processing units may be independent components, or may be integrated into one or more processors, and are configured to process captured image data to generate a video stream.

The transmitter mentioned in this embodiment of this application may be a communications interface on a target camera. The communications interface may be one or more fiber link interfaces, Ethernet interfaces, microwave link interfaces, copper wire interfaces, or the like, and includes a network adapter, a network interface card, a LAN receiver, a NIC, a modem, or the like. The interface unit 130 may be an independent component, or may be partially or completely integrated or packaged in the processor 110 as a part of the processor 110. The transmitter is configured to upload the video stream generated by the processor to the camera authentication system of the terminal.

The to-be-identified camera 2 may further include a power supply (not shown in the drawing). The power supply may be a power supply of the terminal, or may be a power supply independent of the terminal. The to-be-identified camera 2 may further include another component used for an image shooting function or the like. Details are not described herein.

For the to-be-identified camera provided in this embodiment of this application, there is no need to improve an identification function, for example, pre-programming about the identification function, and storage of a private key, a key, and a digital certificate.

Figure 4:
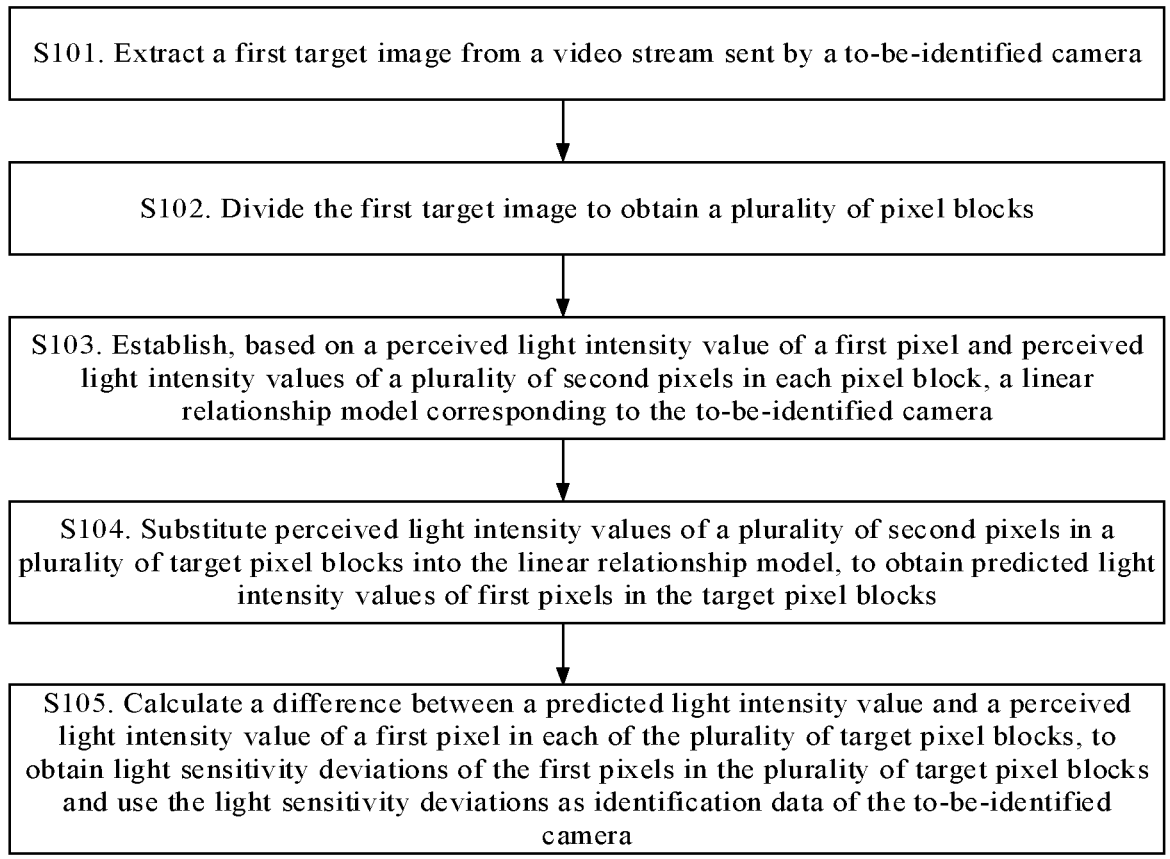
FIG. 4 is a flowchart of a camera identification method according to an embodiment of this application.

FIG. 4 is a flowchart of a camera identification method according to an embodiment of this application. Identification data of a to-be-identified camera may be generated according to the procedure shown in FIG. 4. Details are as follows.

S101: Extract a first target image from a video stream sent by a to-be-identified camera.

S102: Obtain a plurality of pixel blocks from the first target image, where the pixel block includes one first pixel and a plurality of second pixels.

S103: Establish, based on a perceived light intensity value of the first pixel and perceived light intensity values of the plurality of second pixels in each pixel block, a linear relationship model corresponding to the to-be-identified camera, where the perceived light intensity value is a light intensity value corresponding to the video stream.

In an example, the linear relationship model complies with the following formula:

$$x_{a,b} = \sum_{\substack{1 \le j,k \le n \\ (j,k) \ne (a,b)}} c_{j,k} x_{j,k} + p$$

$x_{a,b}$ represents the predicted light intensity values of the first pixels, wherein the first pixels are located in a row a and a column b in the plurality of pixel blocks, wherein $c_{j,k}$ represents a first constant, wherein $x_{j,k}$ represents perceived light intensity values of pixels in a row j and a column k in the plurality of pixel blocks, and wherein p represents a second constant.

S104: Substitute perceived light intensity values of a plurality of second pixels in a plurality of target pixel blocks into the linear relationship model, to obtain predicted light intensity values of first pixels in the target pixel blocks, where the plurality of target pixel blocks are obtained from an image shot by the to-be-identified camera.

S105: Calculate differences between the predicted light intensity values and perceived light intensity values of the first pixels in the plurality of target pixel blocks, to obtain light sensitivity deviations of the first pixels in the plurality of target pixel blocks and use the light sensitivity deviations as identification data of the to-be-identified camera.

Figure 5:
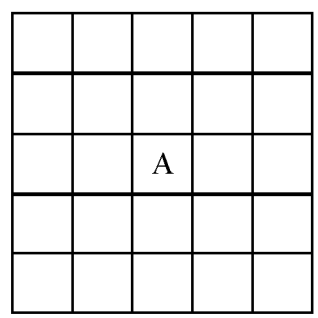
FIG. 5 is a schematic diagram of a radio link control (RLC) bearer according to an embodiment of this application.

In this embodiment of this application, a video stream uploaded by a to-be-identified camera 2 includes at least one picture. The to-be-identified camera 2 captures the video stream, and uploads the captured video stream to a camera authentication system 1. The camera authentication system 1 receives the video stream by using a receiver 101, and extracts, by using a processor 102, an image used to generate identification data, that is, the first target image. The first target image may be one image. To improve a fit between the identification data and a capability of perceiving incoming light by the to-be-identified camera 2, the first target image may be a plurality of images. One first target image is used as an example for description. The first target image is divided into a plurality of pixel blocks, and each pixel block includes n×n pixels, where n≥3, and n is an odd number, for example, 3×3 or 5×5. A size of each pixel block may be the same or different, and the size of the pixel block may be flexibly set based on an actual requirement. FIG. 5 is a schematic diagram of a pixel block according to an embodiment of this application. A pixel block including 5×5 pixels is used as an example in FIG. 5. A pixel A located at a central position of the pixel block is a first pixel, and other pixels are second pixels. The pixels in the pixel block are in a one-to-one correspondence with pixels on a sensor array 202.

Figure 6:
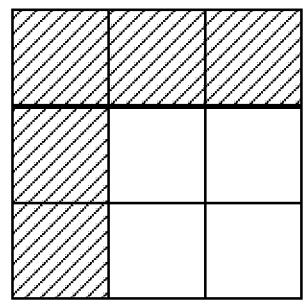
FIG. 6 is a schematic diagram of available pixels according to an embodiment of this application.

When the first target image is divided, in a possible implementation, two adjacent pixel blocks may include some same pixels. Still using a 5×5 pixel block as an example, if boundary pixels of the two adjacent pixel blocks are pixels in a same row or column, for the first target image including 50×50 pixels, 144 pixel blocks may be obtained after division. In another implementation, two adjacent pixel blocks do not include same pixels. Still using a 5×5 pixel block as an example, if boundary pixels of the two adjacent pixel blocks are adjacently distributed in the first target image, for the first target image including 50×50 pixels, 100 pixel blocks may be obtained after division. In this embodiment of this application, only a complete pixel block is selected for an operation. FIG. 6 is a schematic diagram of available pixels according to an embodiment of this application. In this embodiment of this application, only a complete pixel block is selected for an operation, and a first pixel is located at a central position of the pixel block. Therefore, for the first target image, the first pixel is unlikely to appear at an image boundary. Using a 3×3 pixel block as an example, if the pixel block is located in an upper left corner of the first target image, as shown in FIG. 6, shadow parts are second pixels located at the image boundary, and these pixels are unlikely to become the first pixel. For another example, if the pixel block is a 5×5 pixel block, and the pixel block is located in the upper left corner of the first target image, second pixels in two upper rows and two left columns in the pixel block are unlikely to become the first pixel. Using this as an example, the pixels that are unlikely to become the first pixel may be determined in the first target image, and all other pixels than these pixels may become the first pixel, that is, an available pixel in the first target image.

The processor 102 may analyze the first target image, to learn a perceived light intensity value corresponding to each pixel in the first target image, and establish a linear relationship model based on the perceived light intensity value corresponding to the first pixel and the perceived light intensity values of the plurality of second pixels in the same pixel block. In other words, the perceived light intensity values of the plurality of second pixels are used to represent the perceived light intensity value corresponding to the first pixel. For example, $x_{m,n}$ represents a perceived light intensity value of a pixel located in a row m and a column n in the pixel block, and $\widehat{x}_{m,n}$ represents a perceived light intensity value corresponding to the pixel located in the row m and the column n in the pixel block. Using a 5×5 pixel block as an example, a perceived light intensity value corresponding to a first pixel is $\hat{x}_{3,3}$, and perceived light intensity values of second pixels are $x_{1,1}$, $x_{1,2}$, $x_{1,3}$, $x_{1,4}$, $x_{1,5}$, $x_{2,1}$, $x_{2,2}$, $x_{2,3}$, $x_{2,4}$, $x_{2,5}$, $x_{3,1}$, $x_{3,2}$, $x_{3,4}$, $x_{3,5}$, $x_{4,1}$, $x_{4,2}$, $x_{4,3}$, $x_{4,4}$, $x_{4,5}$, $x_{5,1}$, $x_{5,2}$, $x_{5,3}$, $x_{5,4}$, and $x_{5,5}$ in sequence. A linear relationship between the perceived light intensity value corresponding to the first pixel and the perceived light intensity values of the second pixels may be established, as shown in a formula (1):

$$\hat{x}_{3,3} = c_{1,1}X_{1,1} + c_{1,2}X_{1,2} + c_{1,3}X_{1,3} + c_{1,4}X_{1,4} + c_{1,5}X_{1,5} + c_{2,1}X_{2,1} + c_{2,2}X_{2,2} + c_{2,3}X_{2,3} + c_{2,4}X_{2,4} + c_{2,5}X_{2,5} + c_{3,1}X_{3,1} + c_{3,2}X_{3,2} + c_{3,4}X_{3,4} + c_{3,5}X_{3,5} + c_{4,1}X_{4,1} + c_{4,2}X_{4,2} + c_{4,3}X_{4,3} + c_{4,4}X_{4,4} + c_{4,5}X_{4,5} + c_{5,1}X_{5,1} + c_{5,2}X_{5,2} + c_{5,3}X_{5,3} + c_{5,4}X_{5,4} + c_{5,5}X_{5,5} + P \quad (1)$$

The formula (1) may be expressed as follows:

$$\hat{x}_{3,3} = \sum_{\substack{1 \le j,k \le 5 \\ (j,k) \ne (3,3)}} c_{j,k} x_{j,k} + p \quad (2)$$

Herein, $c_{j,k}$ represents a first constant, $x_{j,k}$ represents a perceived light intensity value of a pixel in a row j and a column k in the pixel block, and p represents a second constant. In this way, the perceived light intensity values of all the second pixels in the pixel block may be used to represent the perceived light intensity value corresponding to the first pixel.

There is a linear relationship between the perceived light intensity value corresponding to the first pixel in each pixel block and the perceived light intensity values corresponding to the second pixels in each pixel block. Therefore, the perceived light intensity value corresponding to the first pixel in each pixel block may be represented by the perceived light intensity values of the second pixels corresponding to the first pixel in each pixel block. It can be learned from the foregoing description that, each pixel on the camera should correspond to one real light intensity value when there is no impact from an external factor such as a process. To predict the real light intensity value corresponding to each pixel, the first constant and the second constant in the formula (2) may be optimized through training, so that a linear relationship model that can predict a real light intensity value (predicted light intensity value) corresponding to the first pixel is obtained.

In an example, the linear relationship model may be trained by using a linear regression learning method. In this way, the first constant and the second constant in the linear relationship model are adjusted, so that the predicted light intensity value of the first pixel obtained through calculation by using the linear relationship model can be infinitely close to a real light intensity value of the incoming light.

By using the perceived light intensity values of the plurality of second pixels in each pixel block as an input value of an initial linear relationship model and using the perceived light intensity value of the first pixel in each pixel block as an output value of the initial linear relationship model, each constant in the initial linear relationship model is trained, to obtain the linear relationship model.

During training of the linear relationship model, a plurality of pixel blocks in the first target image are used as samples, a pixel block is selected randomly, and a linear relationship model is established based on a perceived light intensity value corresponding to a first pixel and perceived light intensity values of second pixels in the pixel block. Refer to the formula (2). In this case, the pixel block is used as a previous pixel block, and a new pixel block is selected from the first target image as a current pixel block to train the linear relationship model obtained from the previous pixel block. A perceived light intensity value corresponding to a first pixel and perceived light intensity values of second pixels in the current pixel block are substituted into the linear relationship model. Adjusting the first constant and the second constant can make the obtained linear relationship model close to the perceived light intensity value corresponding to the first pixel in the previous pixel block and the perceived light intensity value corresponding to the first pixel in the current pixel block at the same time. The foregoing process is repeated, and each pixel block in the first target image is used to train the linear relationship model. A predicted light intensity value of a first pixel obtained by substituting perceived light intensity values of second pixels in any pixel block into the trained linear relationship model is infinitely close to a real light intensity value corresponding to the pixel. In this way, the predicted light intensity value of the first pixel in any pixel block may be predicted by using the linear relationship model, and the predicted light intensity value is used to replace the real light intensity value corresponding to the first pixel.

Further, when a plurality of first target images are included, each first target image may train a linear relationship model according to the foregoing process, and a subsequent first target image may also train, according to the foregoing process, a linear relationship model corresponding to a previous first target image. To ensure training quality of the linear relationship model, a quantity of first target images may be increased, and a plurality of video streams uploaded by the to-be-identified camera may also be selected, where the video streams may be distributed in different time segments (real light intensity values with different incoming light, and the like), and the like.

After the linear relationship model is obtained, the predicted light intensity value of the first pixel in each pixel block in the first target image may be predicted. In this way, after a difference between the predicted light intensity value of the first pixel and the perceived light intensity value of the first pixel is calculated, the light sensitivity deviation corresponding to each first pixel may be obtained. These light sensitivity deviations may be used as identification data of the to-be-identified camera and stored for a subsequent authentication process. A target pixel block may be selected for calculating a predicted light intensity value of a first pixel. In this embodiment of this application, the target pixel block may be all pixel blocks in the first target image, or may be a specified pixel block in the first target image, for example, a pixel block at a specified position or a pixel block with a specified identifier. If the target pixel blocks can satisfy accuracy of the generated identification data, a calculation amount can be effectively reduced, and identification efficiency can be improved. The target pixel blocks may be pixel blocks in a same image shot by the to-be-identified camera, or may be pixel blocks in different images shot by the to-be-identified camera; and may be pixel blocks used to train a linear relationship model, or may be new pixel blocks. This is not limited in this embodiment of this application.

In an example, all light sensitivity deviations corresponding to at least one first target image may be stored, and used as identification data of the to-be-identified camera, or a light sensitivity deviation corresponding to a specified first pixel in at least one first target image may be stored, and used as identification data of the to-be-identified camera, or a light sensitivity deviation corresponding to a target first pixel in at least one first target image, for example, N largest light sensitivity deviations, may be stored, and used as identification data of the to-be-identified camera.

After the identification (ID) data of the to-be-identified camera 2 is obtained through the foregoing process, the identification data may be stored in a memory 103 in the camera authentication system 1, to provide a data basis for subsequent authentication of a target camera. Certainly, the identification data of the to-be-identified camera 2 may alternatively be stored on a cloud platform, a cloud server, or the like. In this way, the camera authentication system 1 does not need to locally store the identification data of the to-be-identified camera 2, and may obtain the identification data of the to-be-identified camera 2 from the cloud platform, the cloud server, or the like. The identification data may be stored in a form of a data pair, for example, "a device ID of the to-be-identified camera 2—identification data", "a communications interface name of the to-be-identified camera 2—identification data", or "a geographical location of the to-be-identified camera 2—identification data". When a to-be-authenticated camera sends a video stream, device parameters such as a device ID, a communications interface name, or a geographical location are carried. In this way, the camera authentication system 1 can accurately obtain, based on these device parameters, identification data corresponding to different to-be-authenticated cameras.

According to the foregoing method, identification data of each camera corresponding to a terminal 1 may be generated, so that the identification data can be used by the terminal 1 to authenticate the camera.

Figure 7:
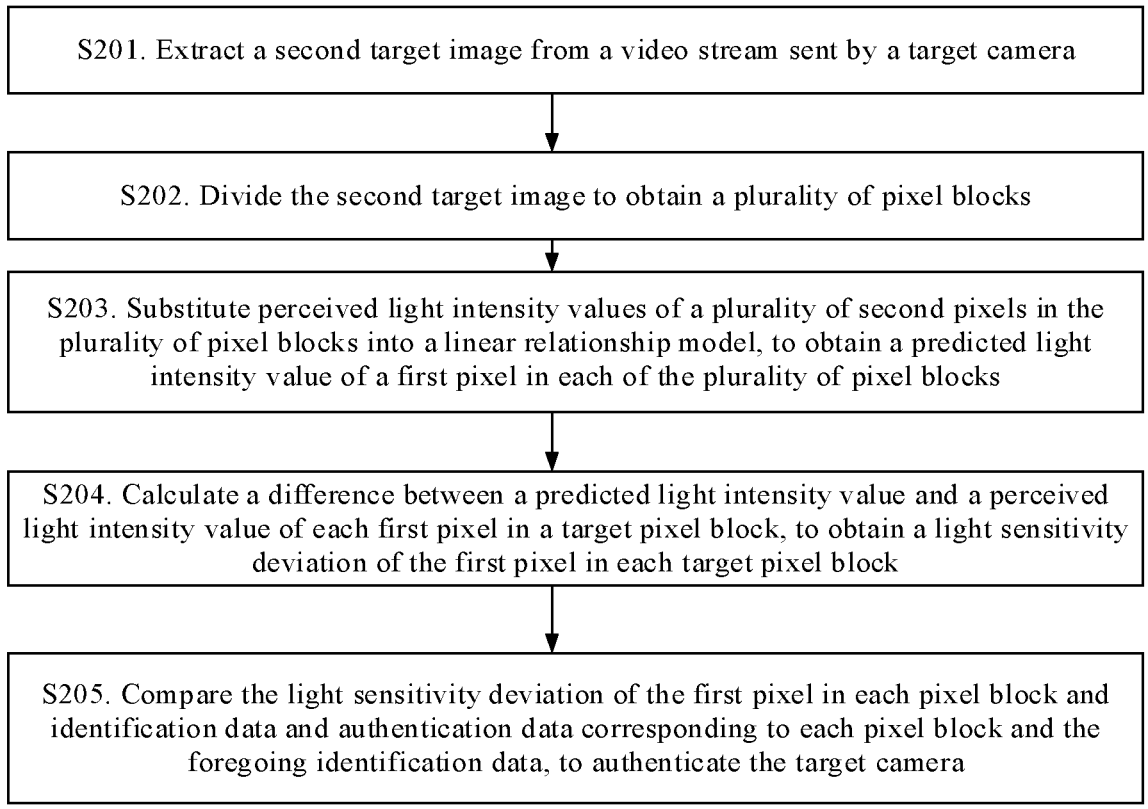
FIG. 7 is a flowchart of an authentication method according to an embodiment of this application.

FIG. 7 is a flowchart of a camera authentication method according to an embodiment of this application. As shown in FIG. 7, the method includes the following steps.

S201: Extract a second target image from a video stream sent by a target camera.

S202: Obtain a plurality of pixel blocks from the second target image, where each of the plurality of pixel blocks includes one first pixel and a plurality of second pixels.

S203: Substitute perceived light intensity values of the plurality of second pixels in the plurality of pixel blocks into a linear relationship model, to obtain a predicted light intensity value of the first pixel in each of the plurality of pixel blocks.

S204: Calculate a difference between the predicted light intensity value and a perceived light intensity value of each first pixel, to obtain a light sensitivity deviation of each first pixel.

S205: Authenticate the target camera based on the light sensitivity deviation of the first pixel in each pixel block and identification data corresponding to each pixel block.

Figure 8:
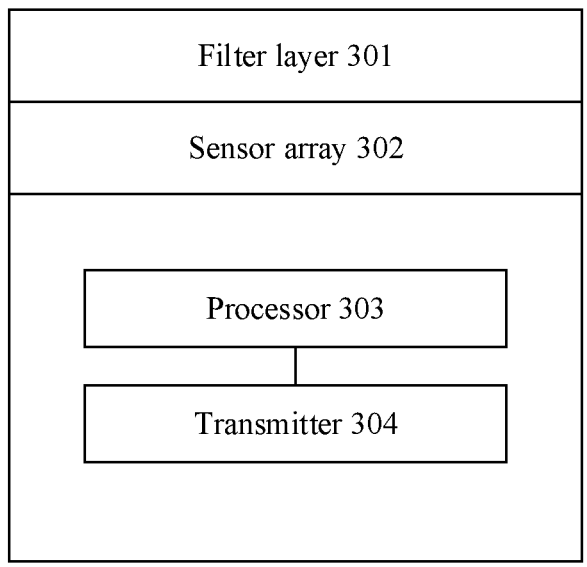
FIG. 8 is a schematic diagram of a structure of a target camera according to an embodiment of this application.

FIG. 8 is a schematic diagram of a structure of a target camera according to an embodiment of this application. In this embodiment of this application, a to-be-authenticated camera is defined as a target camera. As shown in FIG. 8, the target camera 3 includes a filter layer 301, a sensor array 302, a processor 303, and a transmitter 304. For a specific structure of the target camera 3, refer to the structure of the to-be-identified camera 2. Details are not described herein again. The target camera 3 provided in this embodiment of this application corresponds to the to-be-identified camera 2 mentioned above, that is, has a same device ID, communications interface name, geographical location, and the like.

Referring to a data transmission relationship between the camera authentication system 1 and the to-be-identified camera 2 in FIG. 1, after a terminal is connected to the target camera 3, the camera authentication system 1 receives, by using the receiver 101, a video stream sent by the target camera 3. The processor 102 may extract at least one second target image from the video stream, for performing authentication. In this embodiment of this application, extraction of one second target image is used for description. The second target image is divided into a plurality of pixel blocks in the foregoing manner of dividing the first target image. Based on the pixel blocks obtained after division, a predicted light intensity value corresponding to a first pixel in each pixel block is obtained through calculation by using the foregoing obtained linear relationship model. A specific process is as follows, such as obtaining a perceived light intensity value of each second pixel in the pixel block, and inputting each perceived light intensity value into the linear relationship model, to obtain the predicted light intensity value of the first pixel through calculation. The processor 102 continues to obtain a perceived light intensity value of the first pixel in each pixel block. It can be learned from the foregoing description that a difference (light sensitivity deviation) between the perceived light intensity value and the predicted light intensity value of the first pixel corresponding to each camera is different. The target camera 3 that needs to be authenticated also has a unique corresponding light sensitivity deviation. Therefore, the light sensitivity deviation needs to be calculated and used as authentication data of the target camera 3. In an example, the light sensitivity deviation corresponding to the first pixel may be obtained by calculating a difference between the predicted light intensity value and the perceived light intensity value of the first pixel. In this way, the target camera 3 may be authenticated based on the light sensitivity deviation of each first pixel. Details are as follows.

Identification data of a known camera is prestored in the terminal 1 or a cloud end, and the known camera is a camera that has a correspondence with the target camera. For the description of the correspondence, refer to the foregoing description. For a process of identifying the known camera, refer to the foregoing description. In this embodiment of this application, the to-be-identified camera 2 is used as a known camera for description. In this embodiment, a third pixel of the known camera is equivalent to the first pixel of the to-be-identified camera 2, and a fourth pixel of the known camera is equivalent to the second pixel of the to-be-identified camera 2.

In an implementation, the identification data stored in the terminal 1 or the cloud end is light sensitivity deviations of all first pixels. Therefore, the light sensitivity deviations of all the first pixels need to be obtained from the target camera 3 correspondingly, and the target camera 3 may be authenticated by comparing light sensitivity deviations of all first pixels of the target camera 3 with those of the to-be-identified camera 2. In an example, in an implementation 1, a difference between light sensitivity deviations corresponding to first pixels at a same position may be calculated, and when a quantity of deviations whose differences are less than or equal to a difference threshold is greater than or equal to a quantity threshold, it may be considered that a similarity between a light sensitivity deviation of the target camera 3 and a light sensitivity deviation of the to-be-identified camera 2 is relatively high, and it may be determined that the target camera 3 is authenticated successfully, that is, the target camera 3 is the to-be-identified camera 2. Conversely, when the quantity of deviations whose differences are less than or equal to the difference threshold is less than the quantity threshold, it may be considered that the similarity between the light sensitivity deviation of the target camera 3 and the light sensitivity deviation of the to-be-identified camera 2 is relatively low, and it may be determined that the target camera 3 fails to be authenticated, that is, the target camera 3 is not the to-be-identified camera 2. In an implementation 2, a ratio of light sensitivity deviations corresponding to first pixels at a same position may be calculated, and when a quantity of deviations whose ratios are greater than or equal to a ratio threshold is greater than or equal to a quantity threshold, it may be considered that a similarity between a light sensitivity deviation of the target camera 3 and a light sensitivity deviation of the to-be-identified camera 2 is relatively high, and it may be determined that the target camera 3 is authenticated successfully, that is, the target camera 3 is the to-be-identified camera 2. Conversely, when the quantity of deviations whose ratios are greater than or equal to the ratio threshold is less than the quantity threshold, it may be considered that the similarity between the light sensitivity deviation of the target camera 3 and the light sensitivity deviation of the to-be-identified camera 2 is relatively low, and it may be determined that the target camera 3 fails to be authenticated, that is, the target camera 3 is not the to-be-identified camera 2. In an implementation 3, the light sensitivity deviation corresponding to each first pixel may be considered as a vector. For example, the to-be-identified camera 2 corresponds to a first vector, and the target camera 3 corresponds to a second vector. In this way, a similarity between the target camera 3 and the to-be-identified camera 2 is calculated by calculating a similarity between the first vector and the second vector. For example, the two vectors are calculated by using a cosine similarity or another method. For example, the similarity is calculated by using a formula (3):

$$\frac{x \cdot y}{\|x\|\|y\|} = \frac{\sum_{i=1}^{n=1} x_i y_i}{\sqrt{\sum_{i=1}^{n} x_i^2} \sqrt{\sum_{i=1}^{n} x_i^2}} \quad (3)$$

Herein, x represents a light sensitivity deviation corresponding to one first pixel of the to-be-identified camera, y represents a light sensitivity deviation of a first pixel that is on the target camera and corresponding to x, i represents a number corresponding to the light sensitivity deviation, and n represents a total quantity of light sensitivity deviations.

In this way, the similarity between the target camera 3 and the to-be-identified camera 2 can be accurately calculated by using the foregoing formula, to authenticate the target camera 3. FIG. 9 is a schematic diagram of a first similarity comparison result according to an embodiment of this application. FIG. 10 is a schematic diagram of a second similarity comparison result according to an embodiment of this application. As shown in FIG. 9, if there are 50 second target images and each second target image includes a vector including light sensitivity deviations of 100 first pixels, a similarity between vectors of a same camera is from 0.369 to 0.652, and a similarity between vectors of different cameras is almost 0. As shown in FIG. 10, if there are 250 to 500 second target images, and each second target image includes a vector including light sensitivity deviations of 10 first pixels, a similarity between vectors of a same cameras is from 0.959 to 0.998, and a similarity between vectors of different cameras is 0. It can be learned that different quantities of second target images and a quantity of first pixels selected from each second target image affects values of similarities between vectors of the same camera. Therefore, similarity tests need to be performed in advance to learn similarities corresponding to different criteria, and the similarities are stored, and used as similarity criteria when the target camera 3 is authenticated. In this way, a problem that the target camera 3 cannot be accurately authenticated due to an incorrect setting of the similarity threshold is avoided. For example, when a vector used for authenticating the to-be-authenticated camera is that a quantity of first target images is 50 and that each first target image includes light sensitivity deviations of 100 first pixels, the similarity may be set to 0.369; or when a vector used for authenticating the to-be-authenticated camera is that a quantity of first target images is 250 to 500 and that each first target image includes light sensitivity deviations of 10 first pixels, the similarity may be set to 0.959.

Therefore, the to-be-authenticated target camera 3 can be authenticated by comparing light sensitivity deviations of almost all pixels on the sensor array, and authentication accuracy can be improved.

In an implementation, the identification data of the to-be-identified camera 2 stored in the terminal 1 or the cloud end is a light sensitivity deviation of a specified first pixel, where the specified first pixel is a first pixel at a specified position or a first pixel having a specified identifier, or a first pixel that is set based on historical data, or the like. Therefore, the light sensitivity deviation of the specified first pixel needs to be obtained correspondingly from the target camera 3, and the target camera 3 can be authenticated by comparing the light sensitivity deviation of the specified first pixel of the target camera 3 with that of the to-be-identified camera 2. For a specific comparison process, refer to the three implementations in the first implementation. Details are not described herein again.

In this way, the target camera 3 can be authenticated by using light sensitivity deviations of fewer pixels. On a basis of ensuring authentication accuracy, comparison workload can be reduced, and authentication efficiency can be improved.

In an implementation, the identification data of the to-be-identified camera 2 stored in the terminal 1 or the cloud end is target light sensitivity deviations, and the target light sensitivity deviations are a preset quantity of highest light sensitivity deviations among the light sensitivity deviations corresponding to the first pixels. For example, if the preset quantity is 3, and the light sensitivity deviations are 0.1, 0.4, 0.1, 0.5, and 0.6 respectively, the target light sensitivity deviations are 0.4, 0.5, and 0.6. Therefore, a target light sensitivity deviation corresponding to the target camera 3 needs to be obtained correspondingly from the target camera 3, and the target camera 3 can be authenticated by comparing the target light sensitivity deviation of the target camera 3 with that of the to-be-identified camera 2. For a specific comparison process, refer to the three implementations in the first implementation. Details are not described herein again.

Because the target camera 3 is authenticated by comparing pixels having light sensitivity deviations, the authentication accuracy and validity can be effectively improved. In addition, because a quantity of pixels for comparison is relatively small, comparison workload can be effectively reduced, and authentication efficiency can be improved.

In addition, another type of light sensitivity deviation may also be selected as identification data of the to-be-identified camera 2, and comparison work between the target camera 3 and the to-be-identified camera 2 is performed. Details are not illustrated herein.

After the target camera 3 is authenticated, the processor 102 of the camera authentication system 1 needs to generate a corresponding control instruction based on an authentication result. For example, if the authentication result is that the authentication succeeds, the processor 102 generates a control instruction such as a video data response, for example, a sunroof control instruction, a brake instruction, or a refueling instruction. If the authentication result is that the authentication fails, the processor 102 generates a control instruction such as an alarm instruction or a block video data response.

According to the camera identification method, authentication method, system, and terminal provided in the embodiments of this application, the corresponding identification data, that is, light sensitivity deviations of a plurality of first pixels in the first target image, can be generated for the to-be-identified camera. The identification data is a physical characteristic corresponding to the to-be-identified camera. As long as the to-be-identified camera remains unchanged, the identification data will not be lost or changed. Therefore, a stable reference basis can be provided for authenticating the target camera. Further, authentication data is generated based on the light sensitivity deviation of the target camera. In this way, the target camera can be accurately authenticated by comparing the identification data and the authentication data. There is no need to improve the target camera, for example, program the target camera, store a key on the target camera side, or perform encryption/decryption calculation on the target camera side. Therefore, a problem that an authentication process of the target camera fails due to an improvement of the target camera is effectively avoided, and security of the authentication process of the target camera is further improved.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, improvement, or the like made based on the technical solutions of the present disclosure shall fall within the protection scope of the present disclosure.

What is claimed is:

1. A camera authentication method applied to a camera authentication system wherein the camera authentication method comprises:
   receiving a video stream from a target camera;
   extracting a second target image from the video stream;
   obtaining a plurality of pixel blocks from the second target image, wherein each of the plurality of pixel blocks comprises a first pixel and a plurality of second pixels;
   substituting perceived light intensity values of the plurality of second pixels into a linear relationship model to obtain predicted light intensity values of the first pixels in the plurality of pixel blocks;
   calculating a difference between the predicted light intensity values and second perceived light intensity values of the first pixels in the plurality of pixel blocks to obtain light sensitivity deviations of the first pixels; and
   authenticating the target camera based on the light sensitivity deviations of the first pixels and identification data corresponding to the plurality of pixel blocks.

2. The camera authentication method of claim 1, wherein the identification data is of a plurality of second pixel blocks in a known image of a known camera, wherein each of the plurality of second pixel blocks comprises a third pixel and a plurality of fourth pixels, and wherein the identification data is perceived light intensity values of third pixels in the plurality of second pixel blocks and of the plurality of fourth pixels in the plurality of second pixel blocks.

3. The camera authentication method of claim 2, wherein the identification data is a first vector or light sensitivity deviations corresponding to the plurality of second pixel blocks, wherein the light sensitivity deviations is a difference between perceived light intensity values and predicted light intensity values of the third pixels in the plurality of second pixel blocks, wherein the first vector comprises light sensitivity deviations corresponding to target third pixels, and wherein the target third pixels correspond to a preset quantity of highest light sensitivity deviations among light sensitivity deviations corresponding to the third pixels in the plurality of second pixel blocks.

4. The camera authentication method of claim 3, wherein the third pixels are in a one-to-one correspondence with available pixels in the known image, and wherein the available pixels are pixels in the known image other than fourth pixels located at an image boundary.

5. The camera authentication method of claim 1, wherein authenticating the target camera based on the light sensitivity deviations of the first pixels in the plurality of pixel blocks and the identification data corresponding to the plurality of pixel blocks comprises:
   setting a similarity threshold based on a quantity of second target images and a quantity of the plurality of pixel blocks;
   calculating a similarity between the light sensitivity deviations of the first pixels in the plurality of pixel blocks and the identification data; and
   comparing the similarity with the similarity threshold to authenticate the target camera.

6. The camera authentication method of claim 1, wherein the linear relationship model complies with the following formula:

$$x_{a,b} = \sum_{\substack{1 \le j,k \le n \\ (j,k) \ne (a,b)}} c_{j,k} x_{j,k} + p,$$

wherein $x_{a,b}$ represents the predicted light intensity values of the first pixels in the plurality of pixel blocks, wherein the first pixels are located in a row a and a column b in the plurality of pixel blocks, wherein $c_{j,k}$ represents a first constant, wherein $x_{j,k}$ represents perceived light intensity values of pixels in a row j and a column k in the plurality of pixel blocks, and wherein p represents a second constant.

7. The camera authentication method of claim 1, further comprising establishing, based on the perceived light intensity values and the second perceived light intensity values, the linear relationship model corresponding to the target camera.

8. A camera authentication system, comprising:
   a receiver configured to receive a video stream from a to-be-identified camera;
   a memory coupled to the receiver and configured to store identification data of the to-be-identified camera; and
   a processor coupled to the receiver and to the memory, wherein the processor is configured to:
   extract a second target image from the video stream;
   obtain a plurality of pixel blocks from the second target image, wherein each of the plurality of pixel blocks comprises a first pixel and a plurality of second pixels;
   substitute perceived light intensity values of the plurality of second pixels into a linear relationship model to obtain predicted light intensity values of the first pixels in the plurality of pixel blocks;

calculate a difference between the predicted light intensity values and second perceived light intensity values of the first pixels in the plurality of pixel blocks to obtain light sensitivity deviations of the first pixels; and authenticate the to-be-identified camera based on the light sensitivity deviations of the first pixels and identification data corresponding to the plurality of pixel blocks.

9. The camera authentication system of claim 8, wherein the identification data is of a plurality of second pixel blocks in a known image of a known camera, wherein each of the plurality of second pixel blocks in the known image comprises a third pixel and a plurality of fourth pixels, and wherein the identification data is perceived light intensity values of third pixels in the plurality of second pixel blocks and of the plurality of fourth pixels in the plurality of second pixel blocks.

10. The camera authentication system of claim 9, wherein the identification data is a first vector or light sensitivity deviations corresponding to the plurality of second pixel blocks, wherein the light sensitivity deviations is a difference between perceived light intensity values and predicted light intensity values of the third pixels in the plurality of second pixel blocks, wherein the first vector comprises light sensitivity deviations corresponding to target third pixels, and wherein the target third pixels correspond to a preset quantity of highest light sensitivity deviations among light sensitivity deviations corresponding to the third pixels in the plurality of second pixel blocks.

11. The camera authentication system of claim 10, wherein the third pixels are in a one-to-one correspondence with available pixels in the known image, and wherein the available pixels are pixels in the known image other than fourth pixels located at an image boundary.

12. The camera authentication system of claim 8, wherein the processor is configured to:
set a similarity threshold based on a quantity of second target images and a quantity of the plurality of pixel blocks;
calculate a similarity between the light sensitivity deviations of the first pixels in the plurality of pixel blocks and the identification data; and
compare the similarity with the similarity threshold to authenticate the to-be-identified camera.

13. The camera authentication system of claim 8, wherein the linear relationship model complies with the following formula:

$$x_{a,b} = \sum_{\substack{1 \leq j,k \leq n \\ (j,k) \neq (a,b)}} c_{j,k} x_{j,k} + p,$$

wherein $x_{a,b}$ represents the predicted light intensity values of the first pixels in the plurality of pixel blocks, wherein the first pixels are located in a row a and a column b in the plurality of pixel blocks, wherein $c_{j,k}$ represents a first constant, wherein $x_{j,k}$ represents perceived light intensity values of pixels in a row j and a column k in the plurality of pixel blocks, and wherein p represents a second constant.

14. The camera authentication system of claim 8, wherein the processor is further configured to establish, based on the perceived light intensity values and the second perceived light intensity values, the linear relationship model corresponding to the to-be-identified camera.

15. A terminal, comprising:
at least one to-be-identified camera configured to:
obtain a video stream; and
transmit the video stream; and
a camera authentication system coupled to the at least one to-be-identified camera and configured to:
receive the video stream;
extract a second target image from the video stream;
obtain a plurality of pixel blocks from the second target image, wherein each of the plurality of pixel blocks comprises a first pixel and a plurality of second pixels;
substitute perceived light intensity values of the plurality of second pixels into a linear relationship model to obtain predicted light intensity values of the first pixels in the plurality of pixel blocks;
calculate a difference between the predicted light intensity values and second perceived light intensity values of the first pixels to obtain light sensitivity deviations of the first pixels; and
authenticate the at least one to-be-identified camera based on the light sensitivity deviation of the first pixels and identification data corresponding to the plurality of pixel blocks.

16. The terminal of claim 15, wherein the identification data is of a plurality of second pixel blocks in a known image of a known camera, wherein each of the plurality of second pixel blocks comprises a third pixel and a plurality of fourth pixels, and wherein the identification data is perceived light intensity values of third pixels in the plurality of second pixel blocks and of the plurality of fourth pixels in the plurality of second pixel blocks.

17. The terminal of claim 16, wherein the identification data is a first vector or light sensitivity deviations corresponding to the plurality of second pixel blocks, wherein the light sensitivity deviations is a difference between perceived light intensity values and predicted light intensity values of the third pixels in the plurality of second pixel blocks, wherein the first vector comprises light sensitivity deviations corresponding to target third pixels, and wherein the target third pixels correspond to a preset quantity of highest light sensitivity deviations among light sensitivity deviations corresponding to the third pixels in the plurality of second pixel blocks.

18. The terminal of claim 17, wherein the third pixels are in a one-to-one correspondence with available pixels in the known image, and wherein the available pixels are pixels in the known image other than fourth pixels located at an image boundary.

19. The terminal of claim 15, wherein the camera authentication system is configured to:
set a similarity threshold based on a quantity of second target images and a quantity of the plurality of pixel blocks;
calculate a similarity between the light sensitivity deviations of the first pixel in the plurality of pixel blocks and the identification data; and
compare the similarity with the similarity threshold to authenticate the at least one to-be-identified camera.

20. The terminal of claim 15, wherein the linear relationship model complies with the following formula:

$$x_{a,b} = \sum_{\substack{1 \leq j,k \leq n \\ (j,k) \neq (a,b)}} c_{j,k} x_{j,k} + p,$$

wherein $x_{a,b}$ represents the predicted light intensity values of the first pixels in the plurality of pixel blocks, wherein the first pixels are located in a row a and a column b in the plurality of pixel blocks, wherein $c_{j,k}$ represents a first constant, wherein $x_{j,k}$ represents perceived light intensity values of pixels in a row j and a column k in the plurality of pixel blocks, and wherein p represents a second constant.

* * * * *